[11] 3,598,944

[72] Inventors  Peter Weimar
               Kolberger Str. 28A, Karlsruhe;
               Harry Liepelt, Bruhl Str. 27, Staffort, both
               of, Germany
[21] Appl. No. 560,469
[22] Filed     June 27, 1966
[45] Patented  Aug. 10, 1971
[32] Priority  June 28, 1965
[33]           Germany
[31]           G 44 007

[54] A DEVICE FOR THE HEAT TREATMENT OF POWDERY SUBSTANCES BY MEANS OF A HIGH-TEMPERATURE PLASMA
10 Claims, 1 Drawing Fig.

[52] U.S. Cl. ................................................... 219/76,
                                                              219/121
[51] Int. Cl. .................................................. B23k 9/04
[50] Field of Search ........................................ 217/69,
              74—76, 121; 264/.5; 117/93.1, 105.1, 105.2

[56]            References Cited
              UNITED STATES PATENTS
3,182,361   5/1965   Trimble ........................ 219/76 X

*Primary Examiner*—Joseph V. Truhe
*Assistant Examiner*—C. L. Albritton
*Attorney*—Burgess, Dinklage and Sprung ABSTRACT: Apparatus for use therein for heat treating irregular shaped particles of nuclear fuels so as to produce granules of substantially spherical shape comprising preheating the irregular nuclear fuel particles to high temperatures, but below the melting point thereof, separate preheating a carrier gas for the particles, admixing the heated particles with the heated gas, introducing the mixture in predetermined amounts into a high temperature plasma zone, heating the particles in said zone to effect the melting of the surfaces of the particles and to thereby produce the spherical granules.

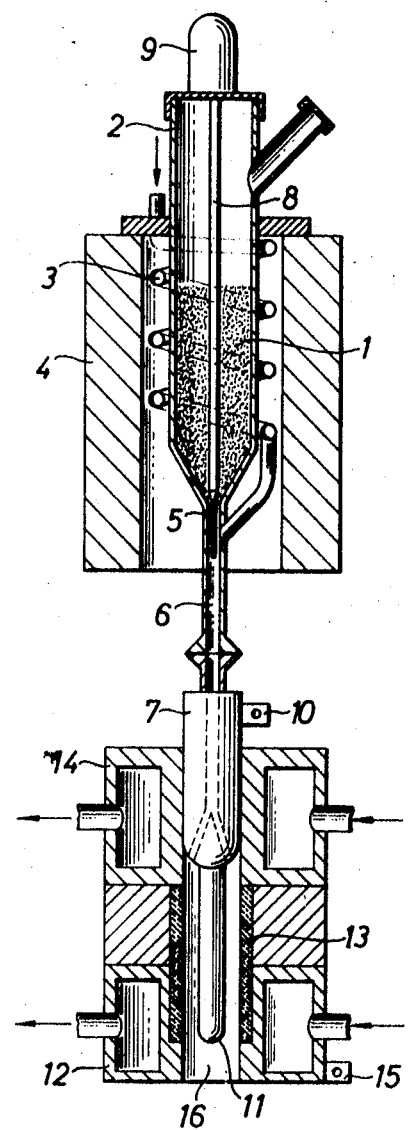

A DEVICE FOR THE HEAT TREATMENT OF POWDERY SUBSTANCES BY MEANS OF A HIGH-TEMPERATURE PLASMA

The invention relates to a method and a device for the heat treatment of powdery substances by means of a high-temperature plasma, especially for melting the grains of powdery high melting point substances for the purpose of converting the angular into a spherical grain shape.

In the fabrication of ceramic nuclear reactor fuel elements it is intended to achieve as high a density of the fuel as possible. Now, this has turned out to be possible when granular nuclear fuel consists of spherical grains. For this purpose the angular grains of a powder are put through a high-temperature plasma causing the grain material to melt and the substance to reemerge from the plasma in a spherical shape. The devices best suited for this purpose have been the so-called direct-current plasma burners where current arc discharge is generated between a rod-type cathode and an anode concentrically surrounding it. The gas which is to form the plasma is fed through this concentric discharge channel, and the powder is introduced into the generated plasma by a carrier gas.

It has been shown that in devices of this type the percentage of energy of the plasma which is transferred to the powder is relatively small and that hence a longer period of sojourn in the plasma up to the melting process is necessary. However, this would require relatively large structures to generate a plasma beam safeguarding this period of sojourn.

It is the object of this invention to provide a method and a device in which the period of sojourn of powdery substances in a high-temperature plasma for the purpose of melting is as long as possible and where the plasma apparatus can be kept relatively small so that there will be a correspondingly favorable heat utilization and an optimum technical efficiency.

Now, it was found out that this object is obtained by the method according to the invention for the heat treatment of powdery substances, especially for melting the grains of high-melting point substances by means of a high-temperature plasma, by the fact that the powdery substance before being brought into the plasma region is heated to higher temperatures, preferably above 1,000° C. (preheated). In particular it is an advantage in a process, in which the powdery substance is finely dispersed in a carrier gas and transported into the plasma region by this gas, to preheat the powdery substance as well as the carrier gas. It has proved to be useful to preheat the powdery substance and the carrier gas separately and mix the two afterwards. In this way the powdery substance is dried and, at the same time, only the dried substance free from all adsorbed gases is introduced into the carrier gas. For this purpose it is useful to preheat the powdery substance and the carrier gas in a common heating device. Moreover, it has proved to be very advantageous to generate the plasma out of the carrier gas containing an admixture of the powdery substance by means of an arc discharge, a high frequency discharge or the like.

A device for the execution of the method according to the invention with a system generating a high-temperature plasma (plasma-burner) according to the invention comprises a preheating device for preheating the powdery substance which is connected in series with the plasma burner and, moreover, a preheating device for the carrier gas connected in series with the plasma burner. It is useful to combine the preheating device for the powdery substance and that for the carrier gas into one common preheating device. At the outlet of the preheating device according to the invention there is a mixing nozzle for the introduction of the powdery substance into the carrier gas, to control the flow of the powdery substance through the opening of the mixing nozzle there may be a vibrating device periodically changing the opening resistance. The dosage of the powdery substance can be controlled in a very simple way by a vibrating device with adjustable vibrating frequency and amplitude.

If a light arc plasma burner consisting of a pin-type cathode and hollow-cylinder anode is used, it is particularly advantageous to design the cathode according to the invention at the same time at least partially as the inlet line for the carrier gas transporting the powdery substance. Now, in order to avoid cooling off of the gas as soon as it leaves the preheating device and enters the cathode designed as an inlet line, the cathode is designed as a resistance heating element to be heated by the current flowing to the light arc. The support of the cathode may be cooled by a liquid. Moreover, it is useful to surround the cathode by a heat insulating sleeve, e.g. of a highly refractory ceramic material, forming the flow channel for the carrier gas in the range in which the anode is surrounded by the carrier gas transporting the powdery substance.

A special way of execution of the device according to the invention is shown in the FIGURE.

The powdery substance 1 is contained in a tubular container 2 and surrounded by a helical pipe 3 containing the carrier gas flow. The tubular container 2 as well as the pipe 3 surrounding it are housed in a furnace 4 acting as a preheating device. At the end of the tubular container 2 there is a nozzle 5 (mixing nozzle) through which the powdery substance 1 is dispersed in the carrier gas and from which both flow through a common line 6 to the cathode 7. The mixing nozzle 5 consists of a funnel-shaped nozzle opening which holds a nozzle needle 8 which is caused to vibrate in its longitudinal direction by a vibrating device 9. The cathode 7 in its bottom section is designed as an inlet line of the carrier gas containing the powdery substance and connected with the negative pole of a direct-current source by the contact piece 10. The upper section 11 of the cathode is designed as a pin and is surrounded by the flow of the carrier gas with the powdery substance. This cathode pin 11 forms a flow channel for the carrier gas together with the concentric anode 12. In order to prevent the carrier gas and the powdery substance it contains from transferring their heat to the walls of the water-cooled anode 12 or the other surrounding walls, a heat insulating cylinder 13 made of ceramic material is provided. The anode 12 as well as the cathode support 14 are cooled by a liquid. The anode 12 is connected with the positive pole of the direct-current source by the contact piece 15. The high-current arc maintained by the direct-current source and generated at point 16 between cathode 7 and anode 12 forms the plasma by means of the carrier gas and the powdery substances contained in it. The electrical resistance of cathode 7 is so dimensioned that owing to the current flow through it simultaneously acts as a resistance heating element to preheat the carrier gas.

We claim:

1. Apparatus for heat treating irregular shaped particles of nuclear fuels for producing granules of substantially spherical shape comprising means for preheating the irregular nuclear fuel particles, means for preheating a carrier gas for transporting said particles, means for mixing said preheated particles and carrier gas, high temperature plasma burner means connected in series with said means for preheating said particles and said means for preheating said carrier gas and means for introducing said mixture of particles and gas in predetermined amounts to said high temperature plasma burner means whereby the surfaces of said particles are melted producing the desired spherical shaping.

2. Apparatus according to claim 1 wherein said means for preheating said particles and for preheating said carrier gas are combined into one common preheating means.

3. Apparatus according to claim 2 including a mixing nozzle for introducing said particles into the carrier gas, said mixing nozzle being arranged at the outlet of said preheating means.

4. Apparatus according to claim 3 including vibrating means adapted for periodically changing the opening resistance for controlling the flow of particles through the opening of said mixing nozzle.

5. Apparatus according to claim 4 wherein said vibrating means has an adjustable vibrating frequency and amplitude.

6. Apparatus according to claim 3 wherein said plasma burner means comprise a light arc plasma burner including a pin-type cathode and a hollow-cylindrical anode concentrically surrounding said cathode wherein said cathode is constructed so as to serve at least partially as an inlet conduit for the carrier gas transporting said particles.

7. Apparatus according to claim 6 wherein said cathode is constructed as a resistance heating element adapted to be heated by current flowing to said light arc.

8. Apparatus according to claim 6 including a support for said cathode and liquid cooling means for cooling said support.

9. Apparatus according to claim 6 wherein said cathode is surrounded by a heat insulating sleeve adapted to serve as a flow channel for the carrier gas in the area in which said anode is surrounded by carrier gas transporting particles of ceramic nuclear fuel.

10. Apparatus according to claim 9 wherein said heat-insulating sleeve is formed of ceramic.